Nov. 12, 1968
W. M. BRUBAKER
3,410,997
MULTIPOLE MASS FILTER
Filed Sept. 8, 1964
2 Sheets-Sheet 1
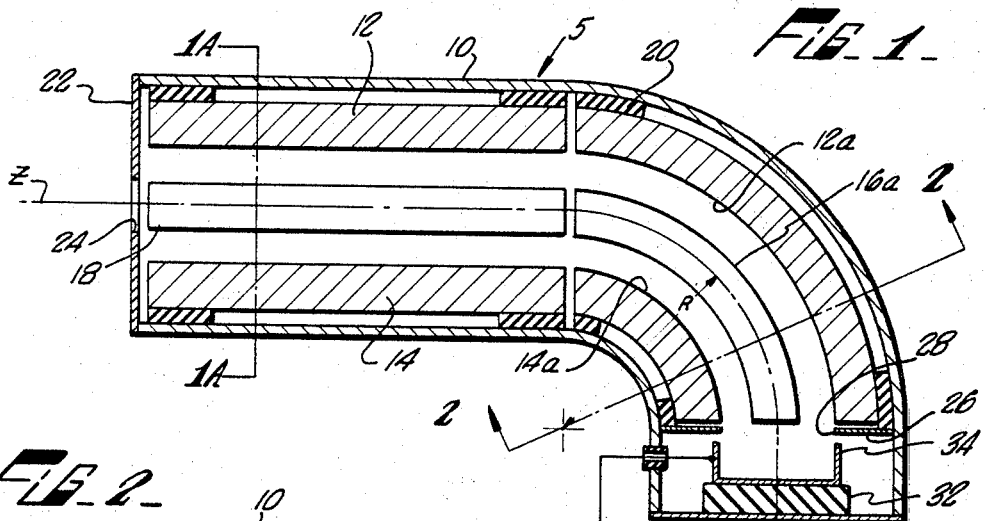
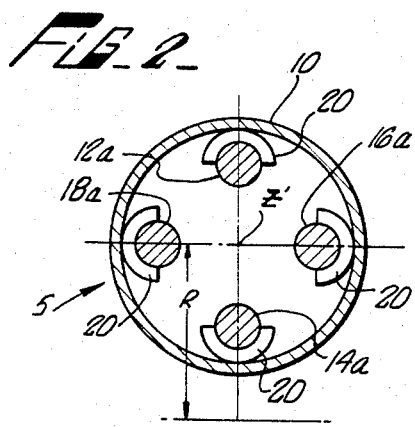
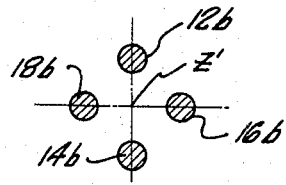
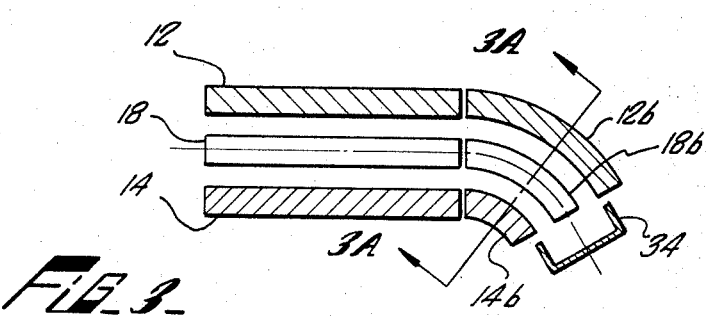
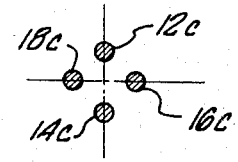
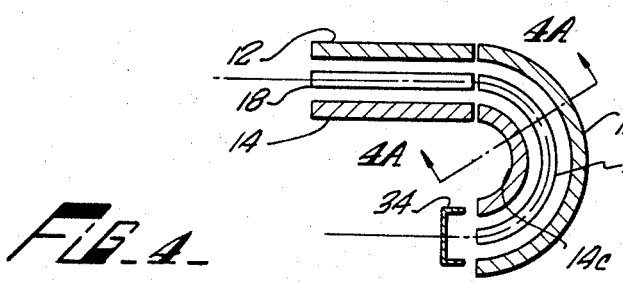
INVENTOR.
WILSON M. BRUBAKER
BY
*Christie, Parker & Hale*
ATTORNEYS.

Nov. 12, 1968     W. M. BRUBAKER     3,410,997
MULTIPOLE MASS FILTER

Filed Sept. 8, 1964

$$a = \frac{8V_{DC} \, e}{MR^2 W^2}$$

$$q = \frac{4V_{ac} \, e}{MR^2 W^2}$$

INVENTOR.
WILSON M. BRUBAKER
BY
ATTORNEYS.

United States Patent Office 3,410,997
Patented Nov. 12, 1968

3,410,997
MULTIPOLE MASS FILTER
Wilson M. Brubaker, Arcadia, Calif., assignor to Bell & Howell Company, Chicago, Ill., a corporation of Illinois
Filed Sept. 8, 1964, Ser. No. 394,815
9 Claims. (Cl. 250—41.9)

This invention relates to multipole mass filters and provides an arrangement through which the residual current and background currents at the collector are virtually eliminated to enhance the operating capabilities of the mass filter.

The basic function of any mass filter is to separate or selectively pass ions having different mass to charge ratios. The multipole mass filter accomplishes this in a unique way, without a magnet, by utilizing the motion of charged particles in a multipole electric field having both alternating and static components.

The conventional multipole mass filter such as that described in U.S. Patent Number 2,939,952, has four elongated continuous electrodes in the form of parallel cylindrical rods arranged symmetrically about a central axis. The rods are electrically connected in pairs, opposing rods being connected together. If Z denotes the central longitudinal axis of the rods, and one pair of rods lie with their centers in the X-Z plane, and the other pair have their centers in the Y-Z plane, the three axes (X, Y and Z) are mutually perpendicular according to the conventional rectangular Cartesian coordinate system. Both AC and DC voltages are applied to the rods. Ions or charged particles are introduced at one end of the filter from an ion source and travel generally down the axis of the filter.

In traversing the filter, ions of different mass to charge ratios are separated so that only ions of selected mass to charge ratios have stable trajectories and emerge from the outlet end of the filter to reach and charge an ion collector, which is connected to a current indicator. Those charged particles which are outside the selected mass to charge ratio have unstable trajectories and impinge on the field-generating electrodes and are thus neutralized. Ion selection is controlled by varying the voltage levels on the electrodes or by varying the frequency of the AC voltages.

As the mass filter is usually used, the AC voltage applied to the pairs of electrodes is usually balanced about a common point, as is the DC voltage. Where this is done, there is a region along the longitudinal Z axis of the filter where the electric field is zero. Those ions with the mass to charge ratio outside the selective range, i.e., those ions whose trajectories are unstable and which enter the mass filter very near or parallel to the axis with small components of radial velocity, have paths which divert slowly from the axis and eventually strike the electrodes, provided the apparatus is long enough.

Generally, the ions which pass through the filter impinge upon a metal collecting electrode which is connected to ground via a high ohmic resistor. The potential drop across the resistor is then a measure of the ion current. Most generally, the collector is a large electrode which is exposed to the ionizing region and the analyzer. Therefore, the collector is vulnerable to the secondary effects such as the radiation from the ion source. Through experience, it has been found that the collector in the mass spectrometer or filter must be very well shielded from the rest of the apparatus, or background currents at the collector are undesirably large and limit the dynamic range of the instrument. The deflection of ions from some of the electrodes and the ion source or active element of the mass filter aligned with the collector are some of the causes of residual current at the collector.

This invention provides a mass filter which removes the collector from alignment with the ion source such that there is no straight path through the filter on which photons can pass to the collector. This arrangement virtually eliminates the secondary effects of soft X-rays and background currents from reaching the collector. One advantage of this invention is that it also increases the dynamic range of the mass filter.

In accordance with this invention, a multipole mass filter for selectively detecting charged particles includes a plurality of elongated and substantially parallel electrodes symmetrically disposed about a central axis. Means for deflecting ions are disposed adjacent the electrodes. A collector is disposed in alignment with the deflecting means and out of alignment with the central axis of the electrodes.

More particularly, the invention includes four elongated parallel rods symmetrically disposed about a central longitudinal axis. Diametrically opposed electrodes are electrically connected in pairs. An AC voltage balanced to a common point is applied across electrically connected pairs of electrodes, as is a DC voltage, which is also balanced at a common point. Thus, equal but opposite AC and DC voltages are applied to the electrically connected pairs of electrodes. This arrangement results in a region of zero electric field along the longitudinal axis of the apparatus. In one arrangement of the invention, a plurality of curved electrodes is provided in spaced relation with the first stated electrodes for deflecting the ion beam from its path along the projected axis of the first electrodes. The curved electrodes are coupled to the first stated electrodes such that the AC voltage is only applied to the curved electrodes. In another embodiment of the invention, DC voltage is applied to the curved electrodes at a magnitude less than the magnitude impressed on the first electrodes. The collector is disposed at the extremity of the curved electrodes so only those ion paths which are curved by the curved electrodes impinge upon the collector.

These and other aspects of the invention will be more fully understood from the following detailed description and the accompanying drawings in which:

FIG. 1 is a schematic cross-sectional view of a quadrupole mass filter constructed according to the invention;

FIG. 2 is a schematic cross-sectional view of the quadrupole filter of FIG. 1, the section taken along line 2—2 of FIG. 1;

FIG. 3 is a schematic view of another embodiment constructed according to the present invention;

FIG. 3A is a cross-sectional view of the electrodes illustrated in FIG. 3, the section taken along line 3A—3A of FIG. 3;

FIG. 4 is a schematic sectional view of another embodiment constructed according to the present invention;

FIG. 4A is a cross-sectional view of the electrodes illustrated in FIG. 4, the section taken along line 4A—4A of FIG. 4;

Figure 1A:
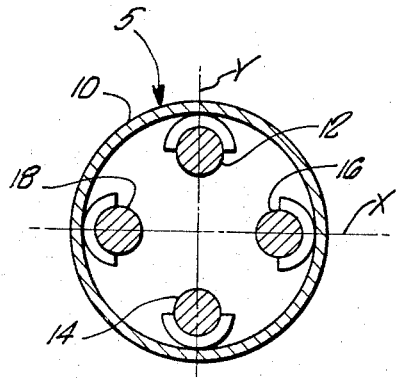
FIG. 1A is a schematic cross-sectional view of the quadrupole filter of FIG. 1, the section taken along line 1A—1A of FIG. 1.

Referring to FIGS. 1 and 2, a quadrupole mass filter 5 includes a cylindrical metallic housing 10 having four primary electrodes 12, 14, 16 and 18 each mounted therein on an individual electrical insulating support 20. While not drawn as such, the electrodes are spaced about a diameter apart such that an electrode of the same cross section could be inserted between the array of electrodes. The primary electrodes are in the form of coextensive conductive cylindrical rods extending parallel to one another and disposed symmetrically about the central axis "Z" of the filter 5. One pair of the diametrically opposed electrodes 12 and 14 lie with their centers in the Y–Z plane and are hereinafter referred to as "Y" poles; and the other pair of opposed electrodes designated 16 and 18 lie with their centers in the X–Z plane and are referred to hereinafter as "X" poles. A conductive plate 22 is mounted across one end of the housing and has a centrally located cylindrical aperture 24 forming the entrance of the filter and called the ion entrance aperture. At the opposite end of the filter is mounted a conductive plate 26 having a central circular aperture 28 which serves as the ion exit aperture for the filter.

Means for providing an ion guide take the form of an array of cylindrical cross-sectioned and arcuately shaped steel electrodes 12A, 14A, 16A and 18A each disposed an equal distance from the axis Z that has a radius R as shown in FIG. 2. Each cylinder is individually mounted on electrical insulating supports 20 and is disposed in spaced relation with the primary electrodes 12, 14, 16, and 18. This particular configuration of electrodes is disposed symmetrically around an arcuately shaped Z axis, and serves as a continuation of the primary electrodes 12–18 for directing the ions to be displaced from the extension of the Z axis of the primary electrodes.

The housing 10 is enclosed by a conductive rear wall 30 on which an electrical insulating support 32 is mounted. An ion collector 34 is mounted on the support 32 opposite the ion exit aperture 28. Ions enter the entrance aperture 24 from an ion source (not shown), traverse the filter, and impinge upon the collector 34 and thereby produce an electrical charge which is measured by a conventional measuring circuit 36 connected between the collector 34 and the conductive rear wall 30.

When used in a laboratory, the housing 10 is evacuated and an ion source (not shown) is mounted over the entrance aperture 24. When a mass filter is employed for high atmosphere research, the ion entrance aperture 24 is exposed and the vacuum is provided by the vacuum in space.

FIGS. 3 and 3A illustrate an alternative embodiment of the particular configuration of the ion guide electrodes. In this embodiment, an array of arcuately shaped electrodes 12B, 14B, 16B and 18B are disposed symmetrically about an arcuately shaped "Z" axis and cover an angle which is less than $\pi/2$. As in the previous embodiment, the electrodes 12B, 14B, 16B, and 18B are disposed in spaced relation to the primary electrodes 12–18.

Referring now to FIGS. 4 and 4A, an alternative embodiment of the invention has an array of ion guide electrodes 12C, 14C, 16C and 18C disposed in spaced relation with the primary electrodes 12–18 similar to the illustrated in FIGS. 1 and 3. The electrodes 12C–18C subtend more than an angle of $\pi/2$.

It is evident that the particular angle of deflection of the ion guide electrodes is not necessarily limited to a particular degree of curve and the only limitation is the displacement of the collector 34 from the Z axis of the primary electrodes 12–18.

The amount of curvature of the ion guide electrodes is not critical with the only requirement being that the collector 34 be positioned or disposed out of alignment with the central axis of electrodes 12–18.

Figure 6:
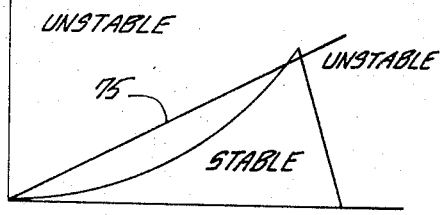
FIG. 6 is a stability diagram illustrating the operating characteristics of a multipole mass filter.

A better understanding of the present invention may be made by referring to the stability diagram illustrated in FIG. 6, in which the values of $a$ and $q$ lie along the line which is called a scan line 75. Values of $a$ and $q$ depend upon the mass to charge ratio of the ions, although the ratio of $a$ to $q$ does not. Therefore, for given values of frequency and AC and DC voltage, the $a$ and $q$ values corresponding to ions of differing mass to charge ratios will be spread along the scan line. Thus, when the scan line is chosen to pass near the apex of the stability curve, the trajectory of ions of a very limited range of mass to charge ratio are stable, with all others unstable. The theoretical resolving power increases as the scan line slope increases and approaches the apex of the stability curve. The resolution is adjusted by varying the ratio of the AC voltage to the DC voltage.

Figure 5:
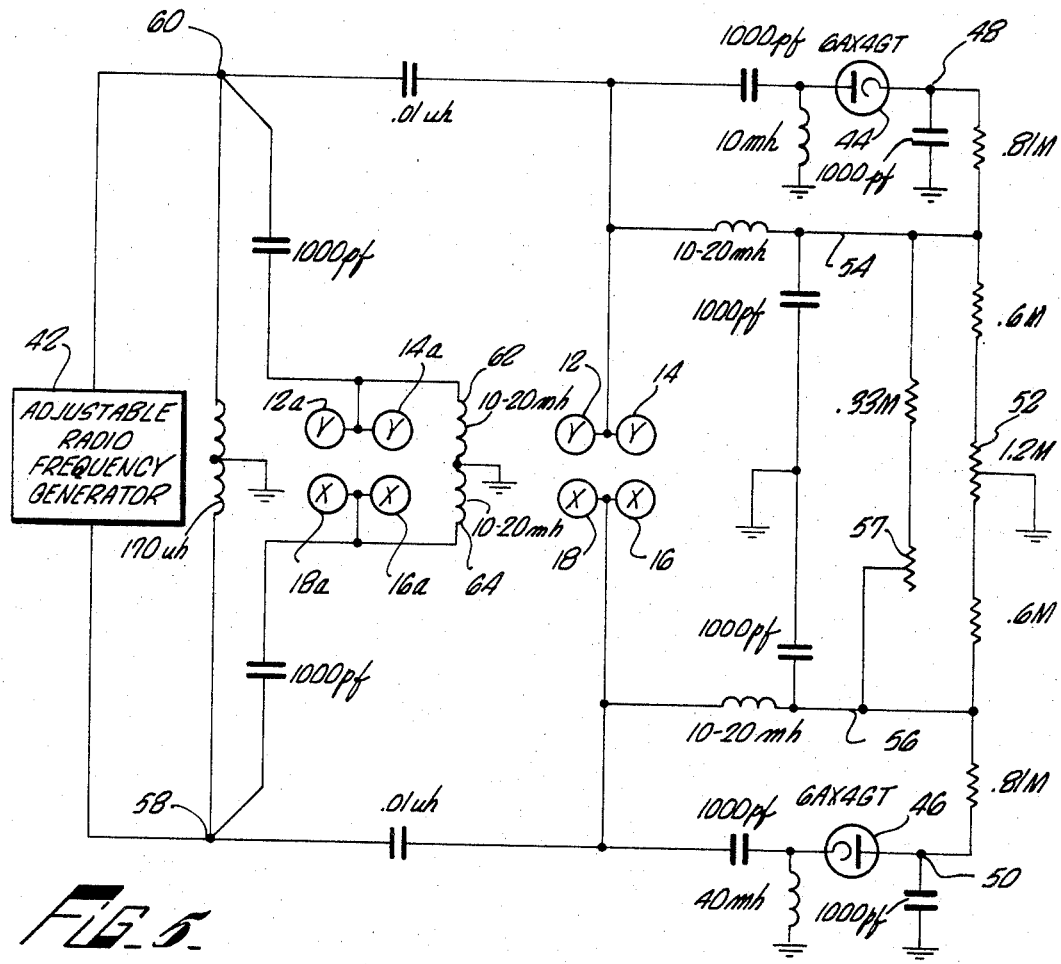
FIG. 5 is a circuit diagram indicating the general manner in which the voltages are applied to the electrodes of the mass filter constructed in accordance with the present invention.

A detailed circuit for applying and controlling the voltage on the primary electrodes and the ion guide electrodes is shown in the circuit diagram of FIG. 5. In this circuit a radio frequency generator 42 has an adjustable peak output voltage and frequency that supplies an AC signal through capacitive coupling to the pairs of primary electrodes 12, 14, and 16, 18.

Rectification of the AC signal from the radio frequency generator is provided by a pair of diodes 44, 46 and the resulting DC voltage is applied across the terminals 48, 50 of a voltage divider network. At terminal 48, the DC voltage is maintained positive with respect to ground and at terminal 50 the voltage is maintained negative with respect to ground. A balance adjustment is provided by a resistor 52 having an adjustable grounded tap. The DC potential is applied to the primary pairs of electrodes and is conducted over a pair of leads 54, 56 through an RF choke and a first arm of the divider network. The magnitude of the DC potential may be adjusted by a variable shunt resistor 57.

The diametrically opposed primary electrodes are connected together in pairs and both AC and DC voltages ($V_{AC}+V_{DC}$) are applied between the two rod pairs. The X rods 16, 18, are DC positive and the Y rods 12, 14 are DC negatives. This creates a quadrupole electric field having both AC and DC components between the rods. The ion guide electrodes are excited by only AC voltage to create an alternating electric field component to help direct the ion beam upon the collector.

In an alternative embodiment (not shown) the ion guide electrodes 12A, 14A, 16A and 18A are impressed with a DC potential which is at a level reduced from the DC potential applied to the primary electrodes 12, 14, 16 and 18. The magnitude of the DC potential applied to the ion guide electrodes is at a maximum of one-half the magnitude applied to the primary electrodes.

The ion guide electrodes 16A and 18A on the X axis are capacitively coupled to the radio frequency generator 42 at the terminal 58. The Y axis ion guide electrodes 12A and 14A are capacitively coupled through terminal 60 to the radio frequency generator 42. Electrodes 12A and 14A and electrodes 16A and 18A are coupled to ground through a pair of RF chokes 62 and 64.

In the X–Z plane, the DC potential on the X electrodes 16 and 18 repel positive ions toward the filter axis; whereas the AC potential causes the positive ions to oscillate about the filter axis analogous to a resonant system. If the amplitude of the oscillations of an ion traversing the mass filter becomes too large, the ion will be lost. It will be noted that in the usual resonant system, the amplitude is bounded for excitation frequencies on either side of resonance, however, in the quadrupole system the ions appear to oscillate with a limited amplitude only when their masses are above the resonant mass. For the resonant mass and all the lighter masses, the amplitude appears to increase without limit.

The primary electrodes 12, 14, 16 and 18 perform the filtering function by the combination of the static field and the alternating field acting in unison to remove all ions not having the proper mass to charge ratio. The ions entering the array of curved ion guide electrodes 12A–18A are subjected to only an alternating field which tends to focus the ion beam toward the axis of the curved electrodes. The ion guide electrodes deflect the ion beam toward the collector 34, which is out of alignment of the inlet aperture and thus is not subject to the background currents due to radiation. This arrangement greatly reduces the residual current to the collector and extends the dynamic range of the mass filter by several orders of magnitude.

The mass filter is operated in exactly the same manner as any multipole mass filter, and this operation is explained in detail in my copending application S.N. 227,783, filed October 2, 1962 now U.S. Patent 3,235,724.

What is claimed is:

1. A multipole mass filter for selectively detecting charged particles comprising:
    a source of charged particles,
    a plurality of substantially parallel first electrodes symmetrically disposed about a central axis, said electrodes being laterally spaced about the central axis electrodes.
    a source of AC voltage,
    means coupling the first electrodes to the AC voltage to create an alternating multipole electric field component between the electrodes,
    a source of DC voltage,
    means coupling the first electrodes to the DC voltage to create a static multipole electric field component between the electrodes,
    a plurality of second electrodes disposed in spaced relation to the exit end of the first electrodes, the second electrodes having a portion thereof adjacent the exit end of the first electrodes disposed in alignment with relation to the first electrodes and the central axis of the first electrodes and a portion thereof remote from the exit end of the first electrodes disposed out of alignment with relation to the central axis of the first electrodes,
    a collector disposed adjacent the exit end of the second electrodes, and
    means for connecting the plurality of second electrodes to a source of deflecting voltage for diverting the trajectory of a charged particle beam emerging from the exit end of the first electrodes.

2. A multipole mass filter for selectively detecting charged particles comprising:
    a source of charged particles,
    a plurality of substantially parallel and coextensive first rod electrodes symmetrically disposed about a central axis, said electrodes being laterally spaced from and parallel to each other and parallel to the central axis,
    a source of AC voltage,
    means for applying the AC voltage to the first electrodes to create an alternating multipole electric field component between the electrodes,
    a source of DC voltage,
    means for supplying the DC voltage to the first electrodes to create a static multipole electric field component between the electrodes,
    a plurality of second electrodes disposed in spaced relation to the exit end of the first electrodes, a portion of the second electrodes adjacent the exit end of the first electrodes being aligned with relation to the first electrodes and the central axis of the first electrodes and a portion of the second electrodes remote from the exit end of the first electrodes being disposed at an angle with relation to the central axis of the first electrodes,
    a collector disposed adjacent the exit end of the second electrodes out of line with the central axis of the first electrodes, and
    means for connecting the plurality of second electrodes to a source of AC voltage for diverting the trajectory of a charged particle beam emerging from the exit end of the first electrodes.

3. A multipole mass filter as defined in claim 2 in which the second electrodes have a central axis which is curved at least in part and is aligned with the central axis of the first electrodes in the portion of the second electrodes adjacent the exit end of the first electrodes.

4. A multipole mass filter as defined in claim 2 in which the second electrodes have an arcuately shaped axis with the exit end of the second electrodes being disposed at right angles to the central axis.

5. A multipole mass filter for selectively detecting charged particles comprising:
    a source of charged particles,
    a first set of substantially parallel and coextensive electrodes symmetrically disposed about a central axis, said electrodes being laterally spaced from and parallel to each other and parallel to the central axis,
    means for applying an AC voltage to the electrodes to create an alternating multipole electric field component between said electrodes,
    means for applying a DC voltage to the electrodes to superimpose a static multipole electric field component on the alternating multipole electric field component between said electrodes,
    a second set of electrodes disposed in spaced relation to the exit end of the first set of electrodes for diverting the trajectory of a charged particle beam from the path of the central axis of the first set of electrodes, said second set of electrodes being aligned with relation to the first set of electrodes and the central axis of the first set of electrodes and having a generally arcuately shaped configuration, and a collector disposed out of alignment with the electrode central axis and in alignment with the exit end of the second set of electrodes.

6. A multipole mass filter as defined in claim 5 and in addition
    means for supplying an AC voltage to the diverting means.

7. A multipole mass filter as defined in claim 5 and in addition
    means for supplying a DC voltage to the diverting means.

8. A multipole mass filter according to claim 5 wherein said diverting means includes a second set of substantially parallel curved electrodes.

9. A quadrupole mass filter for selectively detecting charged particles comprising:
    a source of charged particles,
    four substantially parallel first electrodes symmetrically placed about a central axis,
    means for applying equal and opposite DC voltage to oppositely positioned electrodes to create a static multipole electric field component between the first electrodes,
    means for applying equal and opposite AC voltages to oppositely positioned electrodes to create an alternating multipole electric field component between the first electrodes,
    four substantially parallel second electrodes symmetrically disposed about another axis, said electrodes being located in spaced relation to the exit end of the first electrodes, and being in part aligned with the first electrodes and having a generally arcuately shaped configuration for diverting the trajectory of a charged particle beam,
    a collector disposed in spaced relation to the exit end of the second electrodes and disposed out of alignment with the central axis of the first electrodes and in alignment with the axis of the second electrodes, and
    means for connecting a source of electric potential to the second electrodes, for diverting the trajectory of a charged particle beam emerging from the exit end of the first electrodes.

References Cited

UNITED STATES PATENTS

| | | | |
|---|---|---|---|
| 2,821,656 | 1/1958 | Foster | 313—78 X |
| 2,896,083 | 7/1959 | Hare et al. | 250—41.9 |
| 2,939,952 | 6/1960 | Paul et al. | 250—41.9 |
| 3,147,445 | 9/1964 | Wuerker et al. | 330—4.7 |
| 3,235,724 | 2/1966 | Brubaker | 250—41.9 |

WILLIAM F. LINDQUIST, *Primary Examiner.*